(12) United States Patent
Sankar et al.

(10) Patent No.: US 9,710,349 B2
(45) Date of Patent: Jul. 18, 2017

(54) STORING FIRST COMPUTER TRACE INFORMATION IN MEMORY OF SECOND COMPUTER

(71) Applicant: Texas Instruments Incorporated, Dallas, TX (US)

(72) Inventors: Karthik R. Sankar, Stafford, TX (US); Gary L. Swoboda, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 179 days.

(21) Appl. No.: 14/501,442

(22) Filed: Sep. 30, 2014

(65) Prior Publication Data

US 2015/0127992 A1    May 7, 2015

Related U.S. Application Data

(60) Provisional application No. 61/900,075, filed on Nov. 5, 2013.

(51) Int. Cl.
| | | |
|---|---|---|
| G06F 11/30 | (2006.01) | |
| G06F 11/34 | (2006.01) | |
| G06F 11/36 | (2006.01) | |

(52) U.S. Cl.
CPC ...... *G06F 11/3003* (2013.01); *G06F 11/3065* (2013.01); *G06F 11/3476* (2013.01); *G06F 11/3636* (2013.01); *G06F 11/3048* (2013.01); *G06F 2201/865* (2013.01); *Y02B 60/165* (2013.01)

(58) Field of Classification Search
USPC .......................................................... 714/45
See application file for complete search history.

(56) References Cited

U.S. PATENT DOCUMENTS

| | | | | |
|---|---|---|---|---|
| 5,884,023 A | * | 3/1999 | Swoboda | G06F 11/2268 714/30 |
| 6,167,536 A | * | 12/2000 | Mann | G06F 11/3419 714/45 |
| 6,615,370 B1 | * | 9/2003 | Edwards | G06F 11/3636 714/45 |
| 6,684,348 B1 | * | 1/2004 | Edwards | G06F 11/3636 714/45 |
| 7,076,419 B2 | | 7/2006 | Swoboda | |
| 7,707,395 B2 | * | 4/2010 | Das | G06F 11/3636 712/205 |
| 2002/0055831 A1 | * | 5/2002 | Swoboda | G01R 31/31705 703/19 |

(Continued)

OTHER PUBLICATIONS

Arm, "CoreSight Components Technical Reference Manual," Chap. 8 (2004-2009).

*Primary Examiner* — Kamini Patel
(74) *Attorney, Agent, or Firm* — Lawrence J. Bassuk; Charles A. Brill; Frank D. Cimino

(57) ABSTRACT

A system having a plurality of application computer circuits is disclosed. A first application computer circuit is arranged to process a first application. A trace collection circuit collects trace information from the first application computer circuit. A second application computer circuit is arranged to receive and store the collected trace information in a first mode and to process a second application in a second mode.

9 Claims, 9 Drawing Sheets

(56) References Cited

U.S. PATENT DOCUMENTS

| | | | | |
|---|---|---|---|---|
| 2006/0255972 A1* | 11/2006 | Swoboda | ............... | H03M 7/46 |
| | | | | 341/50 |
| 2006/0255973 A1* | 11/2006 | Swoboda | ............ | G06F 11/3636 |
| | | | | 341/50 |
| 2006/0255975 A1* | 11/2006 | Swoboda | ............ | G06F 11/3636 |
| | | | | 341/50 |
| 2006/0255976 A1* | 11/2006 | Swoboda | ............ | G06F 11/3636 |
| | | | | 341/50 |
| 2006/0255977 A1* | 11/2006 | Swoboda | ............ | G06F 11/3636 |
| | | | | 341/50 |
| 2006/0273944 A1* | 12/2006 | Swoboda | ............ | G06F 11/3476 |
| | | | | 341/139 |
| 2011/0214023 A1* | 9/2011 | Barlow | ............... | G06F 11/364 |
| | | | | 714/46 |

* cited by examiner

STORING FIRST COMPUTER TRACE INFORMATION IN MEMORY OF SECOND COMPUTER

This application claims the benefit under 35 U.S.C. §119 (e) of Provisional Appl. No. 61/900,075, filed Nov. 5, 2013 (TI-74479PS), which is incorporated herein by reference in its entirety.

BACKGROUND OF THE INVENTION

Embodiments of the present invention relate to a system having multiple application computer circuits, wherein one or more of the application computer circuits may function as a trace receiver to debug other application computer circuits in the system.

Contemporary computers, smart phones, and other electronic devices are highly complex systems having multiple application computer circuits that function under the direction of an operating system. These application computer circuits may, for example, be CPUs capable of executing different user application software in parallel. These user applications include a wide variety of tasks related to business applications, content access, entertainment, education, simulation, product engineering, and other user applications. Due to the complex nature of these systems, it is difficult to a) debug or verify the operation of the system that contains the application computer circuits, b) maximize the system's performance, and c) minimize the system's power consumption. Software complexity, real time interrupts, direct memory access (DMA), cache hits and misses, and data exchange between application processors further complicate the debug and verification challenge. Providing visibility into such a system's operation dramatically improves the ability to both debug and verify the system's operation. This visibility is often provided by tracing certain aspects of the system's operation. A trace circuit that records real time operation of an application computer circuit provides this capability. The trace circuit typically includes a trace receiver and a trace memory to store recorded data for subsequent analysis.

A trace receiver typically records trace data generated in real time by one or more trace sources in an encoded format, which may be referred to as trace information. These sources may generate a substantial quantity of trace data during normal operation providing information describing operation of the system containing the application computer circuit(s). The trace receiver typically stores the trace information in a trace buffer or memory that may is circular in nature. Once the trace buffer is full, trace recording either stops or new trace information is recorded over the oldest previously recorded trace information. The recorded trace information may be subsequently used by a host computer to debug or verify operation of the system.

FIG. 1A is a prior art diagram of a computer system 100 coupled to an external debug/trace probe 108 and host computer 110 of the prior art. Debug/trace probe 108 is not part of the system being analyzed. System 100 includes device 104, memory 102, and debug and trace interfaces coupling it to probe 108. An Integrated Development Environment (IDE) application on host computer 110 is used to debug or verify operation of system 100. Probe 108 stores the trace information in a trace buffer or memory 106. This method advantageously separates system memory 102 from trace memory 106. However, since trace information is transmitted from system 100 to probe 108, the bandwidth of this interface may be limited by the method of transmission and interface loading.

FIG. 1B is another prior art diagram where system 120 is coupled to debug probe 126 and host computer 110. Debug probe 126 and host computer 110 are not part of the system being analyzed. System 120 includes device 124 and memory 122. An IDE application on host computer 110 is used to debug or verify operation of system 120. When a trace operation is activated, system 120 generates trace information that is stored in memory 122. The IDE application accesses the trace information stored in memory 122 using probe 126. Since trace information is stored in memory 122, the trace bandwidth is determined by the system memory bandwidth. This configuration also limits the size of trace memory and restricts the amount of memory available to the system for applications. Furthermore, trace information transfers to and from memory 122 may restrict application memory transfers.

FIG. 1C, is a prior art diagram of system 120 coupled to host computer 110. Host computer 110 is not part of the system being analyzed. System 120 includes device 124 and memory 122 and is coupled directly to host computer 110 over a functional interface. An IDE application on host computer 110 is used to debug or verify operation of system 120. When a trace operation is activated, system 120 generates trace information that is either a) transferred in real time to host computer 110 via a high bandwidth interface or b) stored in memory 122 and subsequently transferred to host computer 110. With real time transfer of trace information, bandwidth is limited by the functional interface and the host computer. When trace information is stored in memory 122, the trace bandwidth is determined by the system memory bandwidth. This configuration also limits the size of trace memory and restricts the amount of memory available to the system for applications. Furthermore, trace information transfers to and from memory 122 may restrict application memory transfers.

In previously described systems of the prior art, components such as a host computer, debug probe, or debug/trace probe are connected to the system being analyzed. If these systems are remotely located, these external components may not be easily connected and trace functionality may be compromised. There is therefore a need to increase bandwidth of trace data throughput in a debug and verification mode to accommodate high speed application processors. There is also a need to separate system and trace memories so that they do not interfere with each other. There is a further need to make tracing of a system's operation available at all times, as some failures occur only when a system is deployed in its real operating environment. Finally, there is a need to accomplish these goals with a minimum of additional system hardware and cost.

BRIEF SUMMARY OF THE INVENTION

In a first preferred embodiment of the present invention, there is disclosed a system having a plurality of application computer circuits. A first application computer circuit capable of providing system services is arranged to process a first application. A trace collection circuit is arranged to collect trace information from the first application computer circuit. A second application computer circuit is arranged to receive the collected trace information in a first mode and to process a second application in a second mode.

In a second preferred embodiment of the present invention, there is disclosed a system having a plurality of application computer circuits. A first application computer circuit is arranged to provide system services. A trace collection circuit is arranged to collect trace data from the first application computer circuit. A second application computer circuit is arranged to receive the collected trace information and to provide other system services.

In a third preferred embodiment of the present invention, there is disclosed an integrated circuit including a multicore processor. A first processor core of the multicore processor is arranged to process a first application. A trace collection circuit is arranged to collect trace data from the first processor core to produce trace information. A second processor core of the multicore processor is arranged to record the trace information in a first mode and to process a second application in a second mode.

DETAILED DESCRIPTION OF THE INVENTION

Figure 1A:
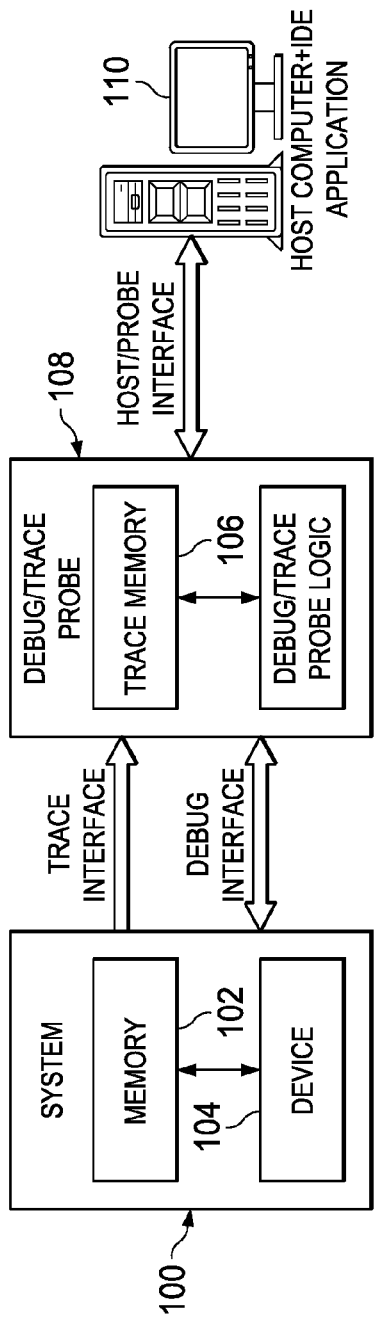
FIG. 1A is a diagram of a system coupled to an external debug/trace probe and host computer of the prior art.
Figure 1B:
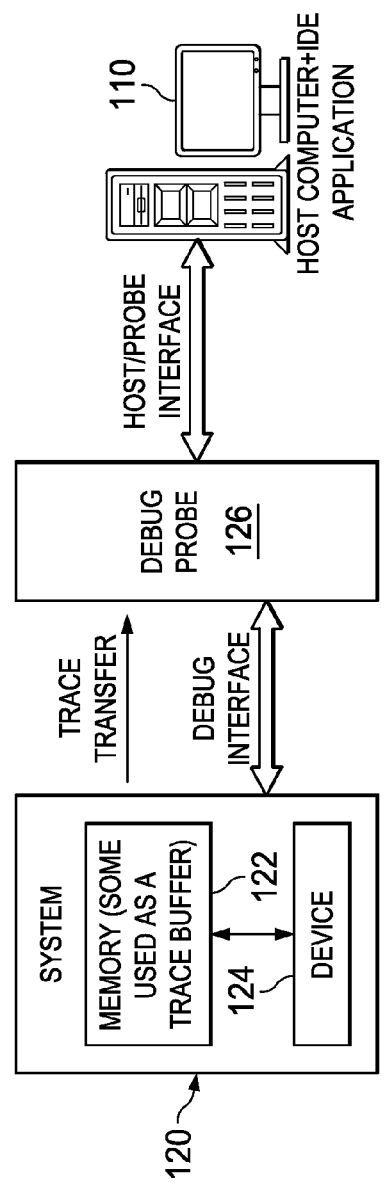
FIG. 1B is a diagram of a system having a combined system and trace memory coupled to an external debug probe and host computer of the prior art.
Figure 1C:
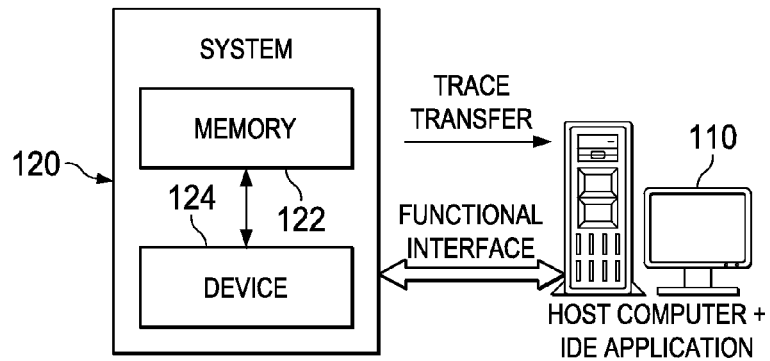
FIG. 1C is a diagram of a system having a combined system and trace memory that is coupled via a functional interface to a host computer of the prior art.
Figure 2A:
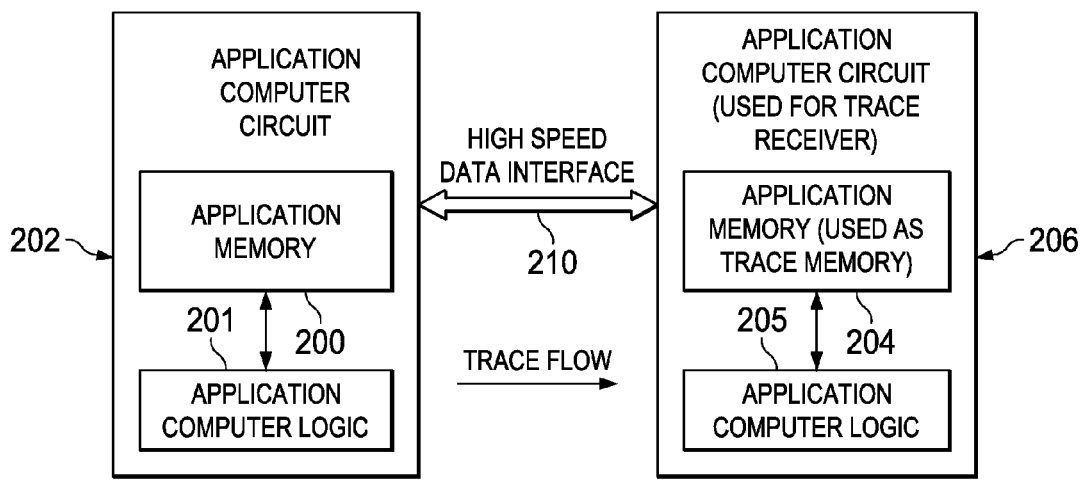
FIG. 2A is a system of the present invention having two application computer circuits, wherein a first application computer circuit 202 generates trace information and a second application computer circuit 206 is designated as a trace computer circuit.

Referring to FIG. 2A, there is a diagram of a system of the present invention that may be formed on a single integrated circuit, on multiple integrated circuits within the system, or on multiple circuit boards. The system has two application computer circuits, which may include respective cores or application processors. One of ordinary skill in the art will appreciate that many features in the following discussion may be implemented in software, hardware, or a combination of software and hardware without departing from the concept of the claimed invention. Application computer circuit 202 includes application computer logic 201 coupled to application memory 200 providing for the execution of user applications in a normal mode of operation. The system includes a second application computer circuit 206 including application computer logic 205 coupled to application memory 204. Application computer circuit 206 is programmed to operate as a trace receiver in a debug mode of operation and may also execute user applications concurrent with operating as a trace receiver. When debug or verification of application computer circuit 202 is desired, application computer circuit 202 is programmed to generate trace information. This trace information is transferred from application computer circuit 202 to application computer circuit 206 over high speed data interface 210. This trace information is stored in a trace buffer within application memory 204. Subsequently, this trace information is utilized by an Integrated Development Environment (IDE) or other application running remote or local to the system being traced. Typically, an IDE provides services such as code coverage, crash analysis, performance analysis, and other functions well known to those of ordinary skill in the art. In general, the term IDE may represent any application that can utilize trace information.

Figure 2B:
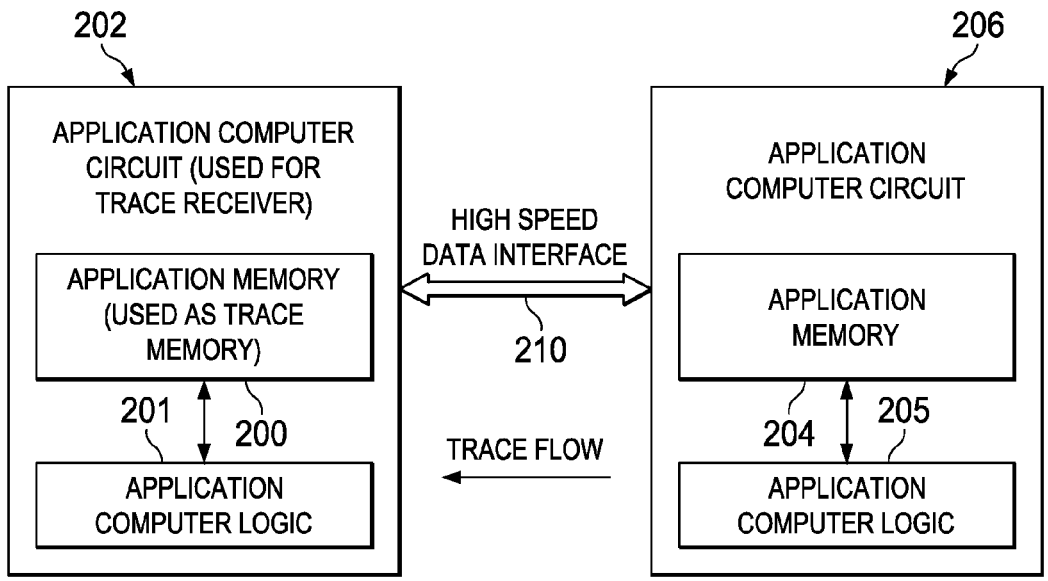
FIG. 2B is a system of the present invention having two application computer circuits, wherein the first application computer circuit 202 is designated as a trace computer circuit and the second application computer circuit 206 generates trace information.

The diagram of FIG. 2B is similar to the diagram of FIG. 2A except the roles of application computer circuit 202 and application computer circuit 206 are reversed. Here and in the following discussion, the same reference numerals are used to indicate substantially the same circuit element. Application computer circuit 206 includes application computer logic 205 coupled to application memory 204 to execute user or OS applications. Application computer circuit 206 generates and transmits trace information to application computer circuit 202. Application computer circuit 202 is programmed to operate as a trace receiver in a debug mode of operation and may also execute user applications concurrent with operating as a trace receiver. When debug or verification of application computer circuit 206 is desired, application computer circuit 206 is programmed to generate trace information. This trace information is transferred from application computer circuit 206 to application computer circuit 202 over high speed data interface 210. This trace information is stored in a trace buffer within application memory 200. Subsequently, this trace information is utilized by an IDE or another application running remote or local to the system being traced. Typically, an IDE provides services such as code coverage, crash analysis, performance analysis, and other functions well known to those of ordinary skill in the art. In general, the term IDE may represent any application that can utilize trace information.

Figure 2C:
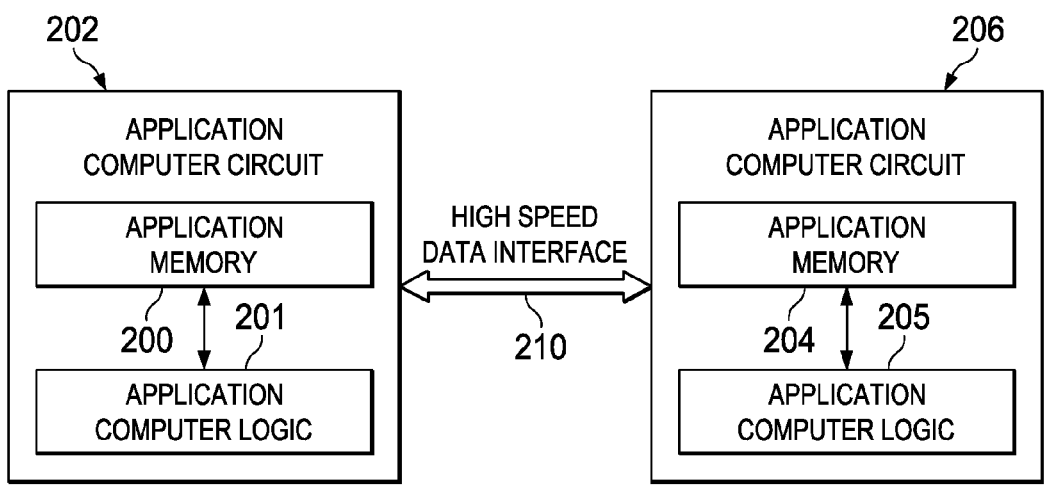
FIG. 2C is a system of the present invention having two application computer circuits, wherein either one may be designated as a trace computer circuit.

The systems of FIGS. 2A and 2B are highly advantageous for several reasons. First, neither a dedicated trace receiver nor trace memory is required for debug and verification of system operation. Both application computer circuits 202 and 206 execute respective user application software during a normal mode of operation as shown at FIG. 2C. During a debug or verification mode, however, either application computer circuit 202 or 206 may be configured to operate as a trace receiver to record trace information generated by the other application computer circuit. Trace information is recorded in the respective trace buffer within the application memory of the application computer circuit operating as a trace receiver. Second, recording trace information in the trace buffer within the trace receiver memory will not interfere with the application memory or normal operation of the corresponding application computer circuit. Finally, since the trace information transfers use existing system data paths, there is no need for a high bandwidth data path to external equipment to record the trace information. Thus, the bandwidth of a trace information transfer is the same as the bandwidth of any other type of system data transfer using the same data path.

Figure 3A:
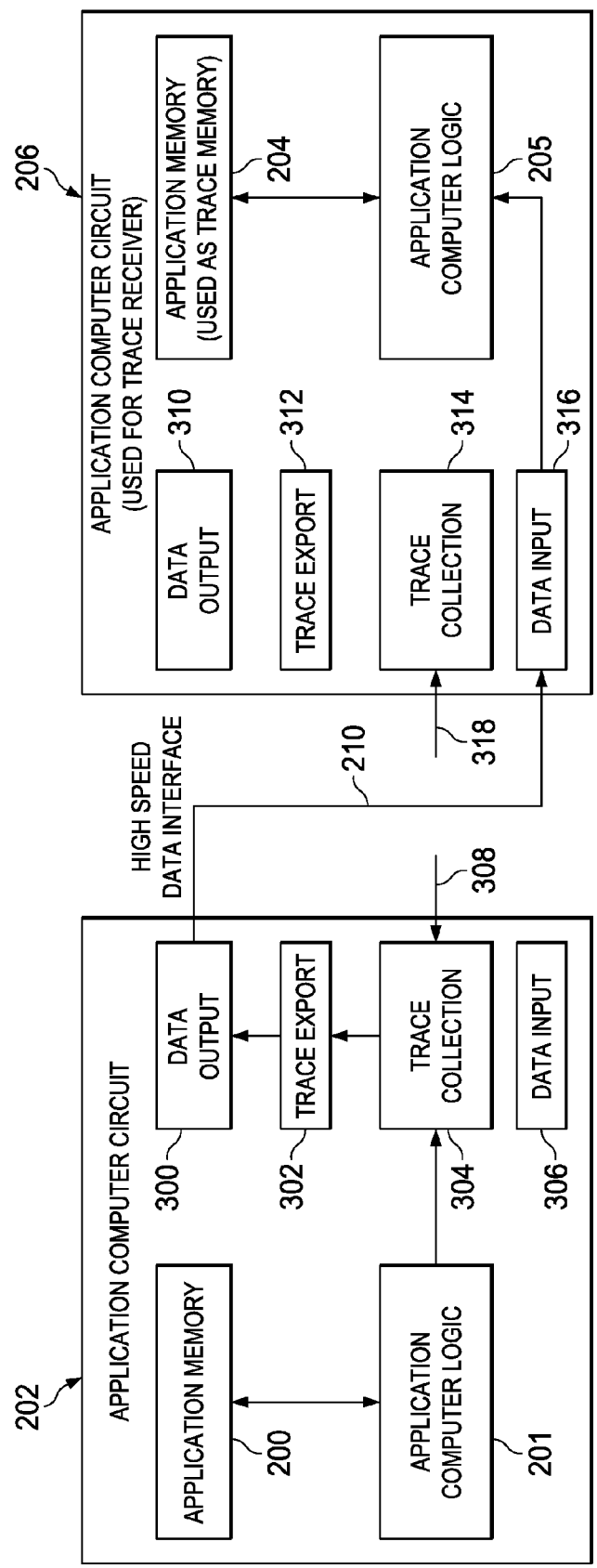
FIG. 3A is a detailed view of the system of FIG. 2A showing the flow of trace information from an application computer circuit 202 to a trace buffer or memory within application memory 204.

Referring now to FIG. 3A, there is a detailed view of the computer circuit of FIG. 2A showing the flow of trace information from application computer circuit 202 to a trace buffer or memory within application memory 204 in application computer circuit 206. In a debug or verification mode, application computer circuit 202 generates trace information while executing an application program. Trace collection circuit 304 monitors the operation of application computer logic 201 and in some cases other system activity 308, which may include the operation of other application computer circuits. This trace data is applied to trace collection circuit 304. The trace collection circuit 304 encodes the trace data and produces trace information. Here and in the following discussion, encoding trace data means to add at least an identification tag to identify the source of the trace data. Other processing may be included in the encoding process. The resulting trace information may also be referred to as trace data. Trace collection circuit 304 is preferably disabled during a normal mode of operation, thereby minimizing power consumption. In a debug and verification mode, however, trace collection circuit 304 applies the trace information to trace export circuit 302. The trace information is then applied to data output circuit 300, which sends it to data input circuit 316 via high speed data interface 210. Data input circuit 316 sends the received trace information to application computer logic 205. In a debug and verification mode, the trace information received by application computer logic 205 is stored in a trace buffer within application memory 204.

Figure 3B:
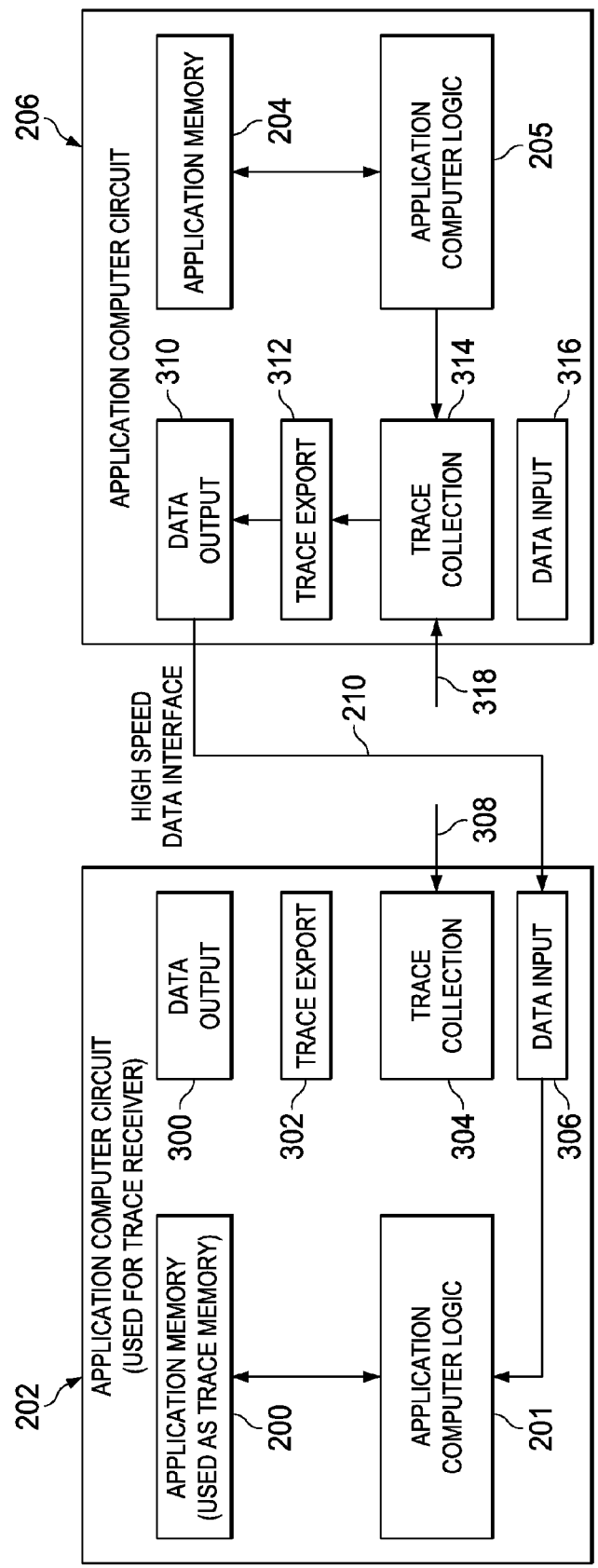
FIG. 3B is a detailed view of the computer circuit of FIG. 2B showing the flow of trace information from an application computer circuit 206 to a trace buffer or memory within application memory 200.

Referring now to FIG. 3B, there is a detailed view of the computer circuit of FIG. 2B showing the flow of trace information from application computer circuit 206 to a trace buffer or memory within application memory 200 in application computer circuit 202. In a debug or verification mode, application computer circuit 206 generates trace data while executing an application program. Trace collection circuit 314 monitors the operation of application computer logic 205 and in some cases other system activity 318, which may include the operation of other application computer circuits. Trace collection circuit 314 encodes the trace data and produces trace information. Trace collection circuit 314 is preferably disabled during a normal mode of operation, thereby minimizing power consumption. In a debug and verification mode, however, trace collection circuit 314 applies the trace information to trace export circuit 312. The trace information is then applied to data output circuit 310, which sends it to data input circuit 306 via high speed data interface 210. Data input circuit 306 sends the received trace information to application computer logic 201. In a debug and verification mode, the trace information received by application computer logic 201 is stored in a trace buffer or memory within application memory 200.

In a preferred embodiment of the present invention, the system of FIGS. 3A and 3B is formed on a single integrated circuit including a multicore processor. Application computer circuits 202 and 206 are processor cores of the multicore processor. Processor cores 202 and 206 may be reduced instruction set computer (RISC) cores (such as SPARC and cores based on designs from ARM and MIPS), complex instruction set computer (CISC) cores (such as Intel Architecture cores from Intel and AMD, and System/360 and z/Architecture cores from IBM), or a combination of the two. Application memory circuits 200 and 204 may be formed together with respective processor cores 202 and 206. Alternatively, application memory circuits 200 and 204 may be formed separately on the integrated circuit with respective address space associated with processor cores 202 and 206. High speed data interface 210 is formed on the integrated circuit with the multicore processor. The multicore processor is not limited to two processor cores and may include multiple cores forming a computing cluster as discussed below with regard to FIGS. 6A through 6C or multiple computing clusters as discussed with regard to FIGS. 7A through 7B.

Figure 4:
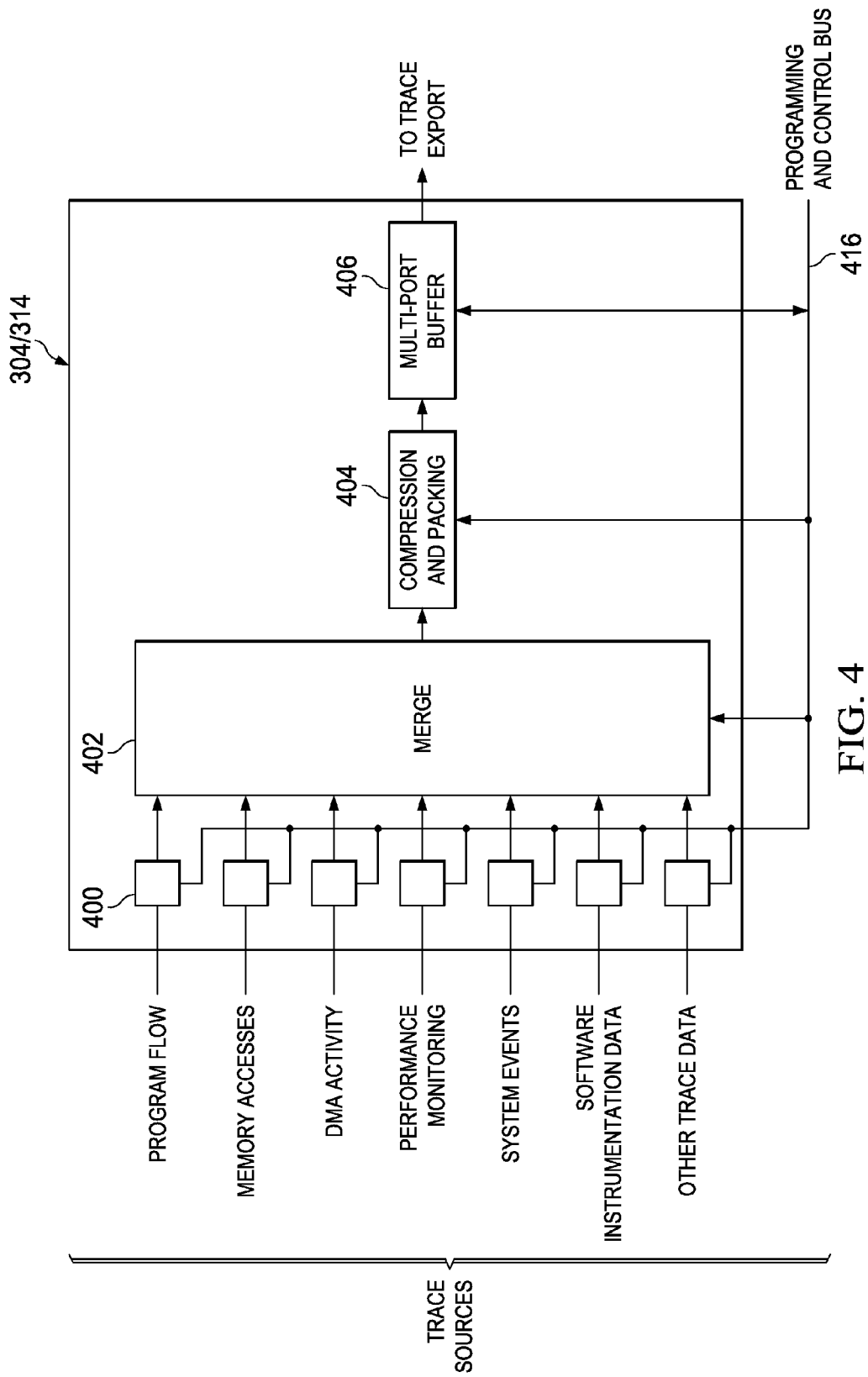
FIG. 4 is a diagram of a trace collection circuit as shown at 304 (FIG. 3A) and 314 (FIG. 3B)

Referring next to FIG. 4, there is a diagram of a trace collection circuit as shown at 304 (FIG. 3A) and 314 (FIG. 3B). The trace collection circuit has seven exemplary input channels to receive trace data related to program flow, memory accesses, DMA activity, performance monitoring, system events, software instrumentation data, and other system activity. One of ordinary skill in the art having access to the instant application will appreciate that there may be more or less input channels as required to monitor operation of the application computer circuit. Each input channel is coupled to a respective encoding logic block such as encoding logic block 400. One method of encoding is described in detail by Swoboda in U.S. Pat. No. 7,076,419, filed Aug. 30, 2001, and incorporated by reference herein in its entirety. As previously discussed, encoding trace data means to add at least an identification tag to identify the source of the trace data. Other processing may be included in the encoding process. The encoding logic blocks of interest are selected while unselected channels preferably remain in a low power state. Selected blocks begin operation when enabled by a respective control signal from programming and control bus 416. Selectively enabling the encoding logic blocks advantageously provides a means to collect only trace data that is required to monitor specific application computer circuit activity of interest while minimizing power consumption. The output from selected encoding logic blocks is then applied to merge circuit 402 where it is merged into a sequential data stream. This data stream has a respective identity tag (ID) to identify the source of each element in the data stream. The output of merge circuit 402 is then optionally compressed and packed by circuit 404. One method of compression and packing is described in detail by the ARM DDI 0314H Coresight™ components technical reference manual, and incorporated by reference herein in its entirety. By way of explanation, compression and packing creates a data stream with both trace data source information (ID) and trace data generated by the sources where the number of identity tags is minimized. It preferably places the ID and respective trace data from each channel in a format that distinguishes between the two types of data. The compressed and packed data format identifies each entry as either an ID or data, inserts IDs in the data stream only when the source of the data changes or after a period of time, and provides maximum data bandwidth and sufficient information to determine the source of the trace data. The compressed and packed trace information is then stored in multi-port buffer 406. Multi-port buffer 406 provides temporary storage until the trace information is transferred to trace export circuit 302 or 312. Buffer 406 preferably has at least a dual port configuration so that current trace information may be read by the trace export circuit while new trace information is being received from circuit 404. Buffer 406 may support simultaneous or interleaved reads and writes.

Figure 5:
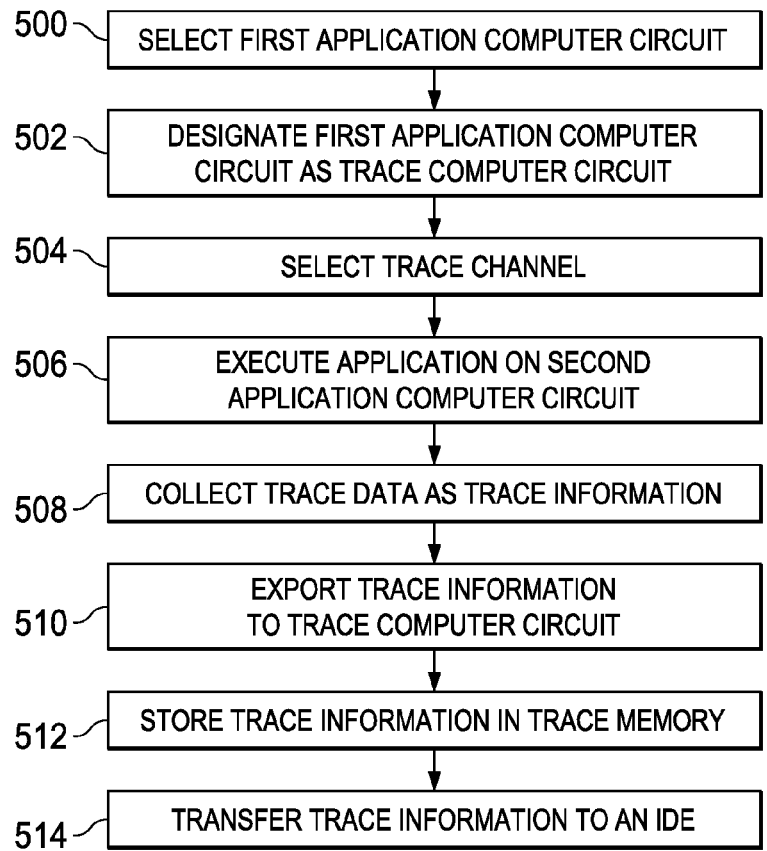
FIG. 5 is a flow diagram showing operation of the systems of FIG. 3A or 3B.

Turning now to FIG. 5, there is a flow diagram showing operation of the computer circuits of FIG. 3A or 3B. The order of the steps in FIG. 5 may vary and still fall within the scope of the claimed invention. Operation begins at step 500 with the selection of a first application computer circuit. At step 502, the first application computer circuit is designated as a trace computer circuit. At step 504, appropriate trace channels are selected. Here, there may only be a single trace channel or multiple trace channels. A second application computer circuit begins execution of a dedicated user application at step 506, thereby generating trace data. The generated trace data is collected at step 508 by trace collection circuit 304 or 314 (FIG. 4). At step 510, the collected trace information is exported to the designated trace computer circuit. At step 512, the designated trace computer circuit stores the trace information in a trace buffer or memory within its application memory. The stored trace information is subsequently transferred to an IDE application running on a local or remote computing resource for analysis. In a preferred embodiment of the present invention, the trace information may be transferred to the IDE while the trace recording is in progress.

Figure 6A:
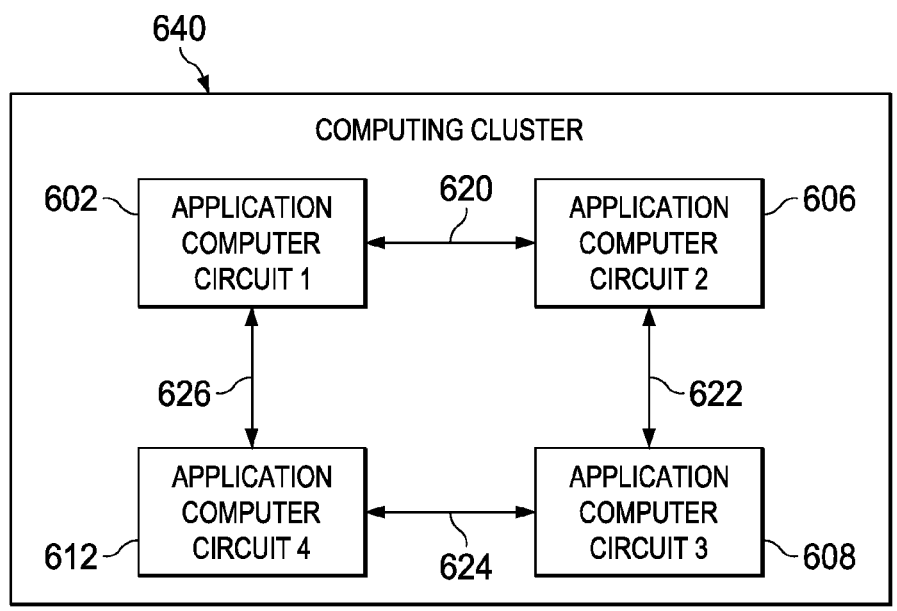
FIG. 6A is a computing cluster of the present invention having four application computer circuits.

FIG. 6A shows how the previously described two application computer circuits of FIGS. 3A and 3B (a computing cluster) may be extended to a computing cluster having a greater number of application computer circuits. A computing cluster may have any practical number of application computer circuits with any connection topology, such as point-to-point, ring, star, mesh, etc. In FIG. 6A, computing cluster 640 has four application computer circuits connected in a ring topology. Application computer circuit 602 is coupled to application computer circuits 606 and 612 by respective high speed interface bus 620 and 626. Likewise, application computer circuit 608 is coupled to application computer circuits 606 and 612 by respective high speed interface bus 622 and 624.

Figure 6B:
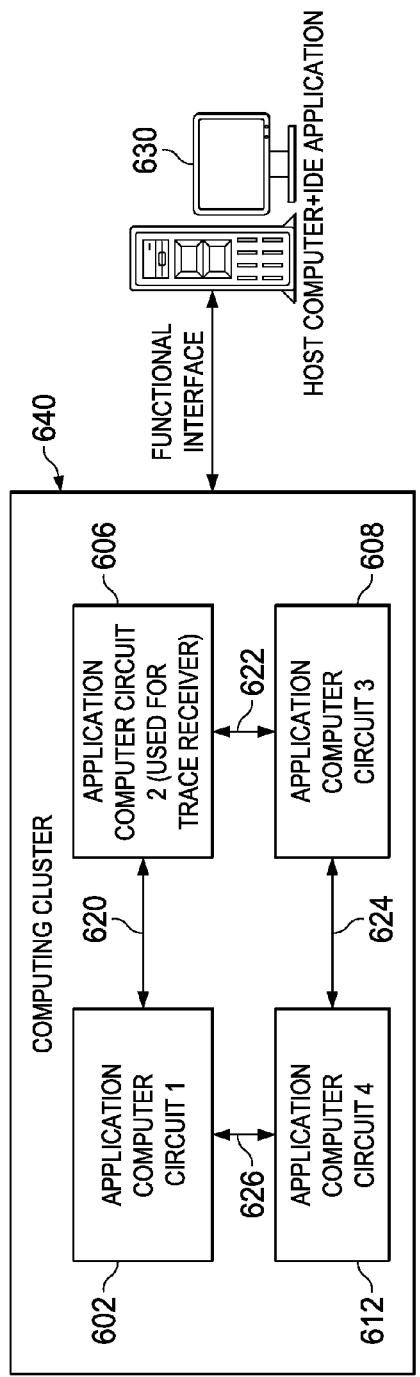
FIG. 6B is a computing cluster of the present invention as in FIG. 6A, wherein one of the four application computer circuits is designated as a trace computer circuit with a remote IDE application.

FIG. 6B shows computing cluster 640 coupled to a host computer 630 via a functional interface. In computing cluster 640, application computer circuit 606 is designated as a trace receiver. Correspondingly, all or part of the application memory of application computer circuit 606 is designated as a trace buffer or memory. In this configuration, application computer circuit 606 may record trace information from application computer circuit 602 via interface 620 or from application computer circuit 608 via interface 622. Additionally, application computer circuit 606 may indirectly record trace information from application computer circuit 612. Trace information is transferred from application computer circuit 612 to application computer circuit 608 via interface 624. This trace information is then forwarded from application computer circuit 608 to application computer circuit 606 via interface 622. Alternatively, trace information may be transferred from application computer circuit 612 to application computer circuit 602 via interface 626. This trace information is then forwarded from application computer circuit 602 to application computer circuit 606 via interface 620. The recorded trace information is subsequently transferred over the functional interface to an IDE running on a remote host computer 630 for analysis. Alternatively, any of application computer circuit 602, 608, or 612 might be designated as a trace receiver and record trace information similar to application computer circuit 606 as described above. For example, application computer circuit 612 might be designated a trace receiver and record trace information from application computer circuit 602 via interface 626 or from application computer circuit 608 via interface 624. Additionally, application computer circuit 612 may indirectly record trace information from application computer circuit 606. Trace information is transferred from application computer circuit 606 to application computer circuit 608 via interface 622. This trace information is then forwarded from application computer circuit 608 to application computer circuit 612 via interface 624. Alternatively, trace information may be transferred from application computer circuit 606 to application computer circuit 602 via interface 620. This trace information is then forwarded from application computer circuit 602 to application computer circuit 612 via interface 626. The recorded trace information is subsequently transferred over the functional interface to an IDE running on a remote host computer 630 for analysis.

Figure 6C:
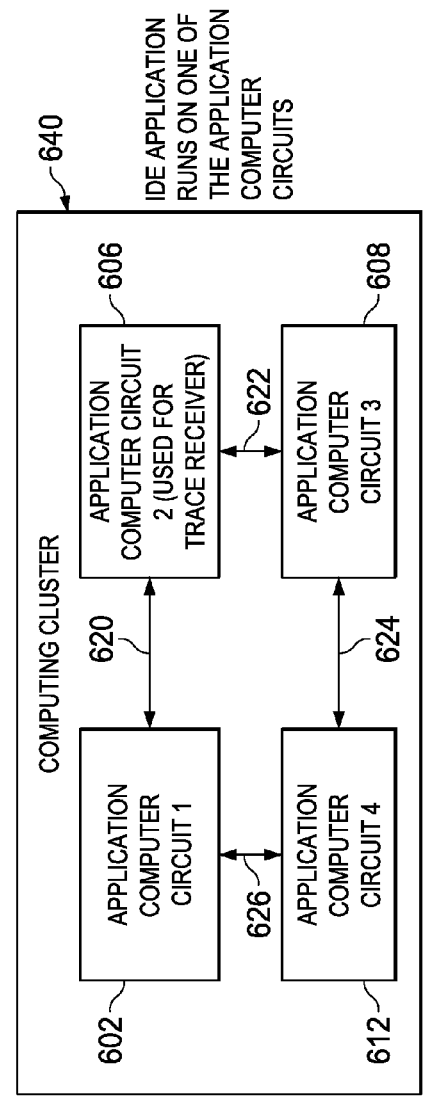
FIG. 6C is a computing cluster of the present invention as in FIG. 6A, wherein one of the four application computer circuits is designated as a trace computer circuit with a local IDE application.

FIG. 6C shows an alternative embodiment of the present invention where the IDE shown in FIG. 6B may be executed as an application on any of the application computer circuits of 602-612. This advantageously eliminates a need for a host computer and interface to the system being analyzed. For example, application computer circuit 602 may execute an application and generate trace information. Application computer circuit 606, acting as a designated trace receiver, may record the trace information. Any application computer circuit (602-612) within computing cluster 640 may execute the IDE application.

Figure 7A:
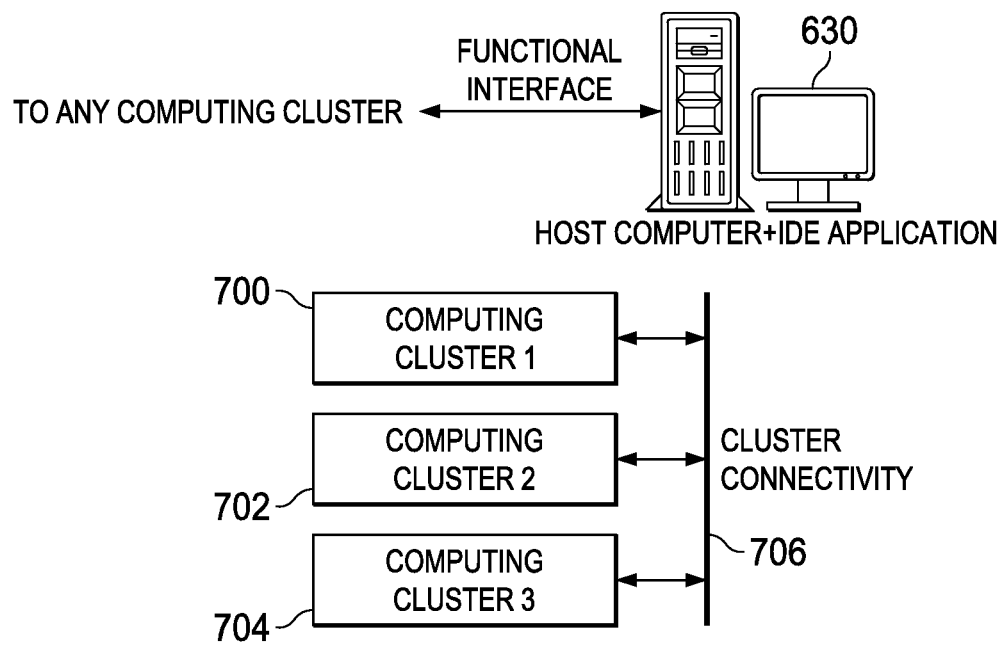
FIG. 7A is a diagram of a computer circuit having three computing clusters as in FIGS. 6A, 6B and 6C, wherein at least one application computer circuit is designated as a trace computer circuit with a remote IDE application.

Referring to FIG. 7A, there is a diagram of a system having three computing clusters 700-704 as described in FIGS. 6A and 6B with cluster connectivity 706. A system may have two or more computing clusters with any connection topology, such as point-to-point, ring, star, mesh, tree, etc. As in FIG. 6B, at least one application computer circuit in one of the computing clusters is designated as a trace receiver with any other application computer circuit within one of the computing clusters generating trace information. An IDE application running on the host computer 630 may be coupled to the application computer circuit designated as a trace receiver through any functional interface provided by the system. The architecture of FIGS. 6A and 6B, therefore, may be advantageously extended to a system having any practical number of computing clusters.

Figure 7B:
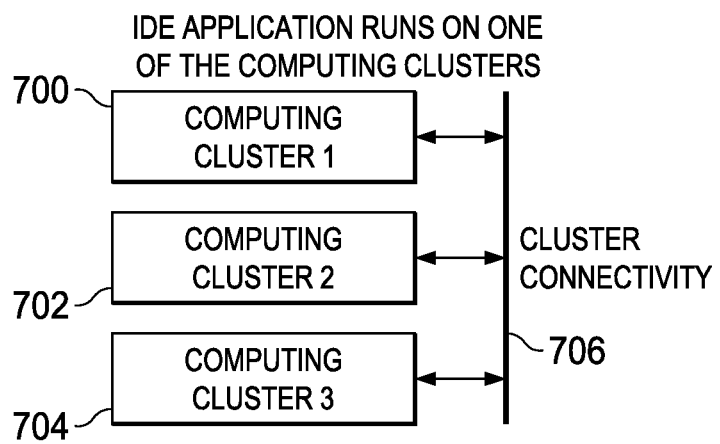
FIG. 7B is a diagram of a computer circuit having three computing clusters as in FIGS. 6A, 6B and 6C, wherein at least one application computer circuit is designated as a trace computer circuit with a local IDE application.

Referring to FIG. 7B, there is a diagram of a system having three computing clusters 700-704 as described in FIGS. 6A and 6B. As in FIG. 6B, at least one application computer circuit of the computing clusters is designated as a trace receiver with any other application computer circuit within one of the computing clusters generating trace information. The IDE shown in FIG. 7A may be executed as an application on any of the application computer circuits shown in FIG. 7B. This advantageously eliminates a need for a host computer and interface to the system being analyzed.

One skilled in the art should recognize that many different application computer circuit architectures are utilized across various application spaces. For example, some application computer circuit architectures emphasize high performance while others emphasize low power. Yet others balance performance and power. A brief description of high performance and low power architectures is included in the following paragraphs to emphasize the diversity of the application computer circuit architectures to which this invention is applicable.

The high performance application space includes 4G/LTE telecommunication base stations, high end telecommunication systems, and cloud computing systems. The application computer circuit architecture utilized in this space may include any combination of DSP (Digital Signal Processor) cores, GPPs (general purpose processors), ASIC (application specific integrated circuit), FPGA (Field programmable gate array), along with complex memory architectures and complex system interconnection schemes. DSP cores include the TI C6xxx™, Freescale Starcore™, etc. GPPs include Intel Core™, Intel Atom™, ARM Cortex™ A series, Power PC™, MIPS™, etc. High performance FPGAs include those manufactured by Xilinx, Altera, etc.

The low power application space includes consumer electronics and battery powered medical instruments. The application computer circuit architecture utilized in this space is relatively simple compared to the high performance application space. This architecture may combine a single computational element (DSP, GPP, ASIC, or FPGA), a simple memory architecture (that may or may not include a MMU (Memory Management Unit)), and a simple system interconnect. DSP cores include the TI C55xx™, Freescale 56xxx, etc. GPPs include Intel QUARK™, ARM Cortex™-M series, etc. Low performance FPGAs include those manufactured by Xilinx, Altera, Lattice Semiconductor, etc. One skilled in the art should recognize that many application computer circuit architectures may contain a mix of the attributes described for the high performance and the low power applications spaces.

Still further, while numerous examples have thus been provided, one skilled in the art should recognize that various modifications, substitutions, or alterations may be made to the described embodiments while still falling within the inventive scope as defined by the following claims. For example, previous embodiments of the present invention have described a system with multiple application computer circuits, where any one may operate as a trace receiver for trace information generated by other application computer circuits. The system may be formed on a single integrated circuit or on separate integrated circuits. Likewise, computing clusters may be formed on a single integrated circuit or on separate integrated circuits. In another example, some application computer circuits may be capable of only importing trace information while others may only be capable of exporting trace information. In another example, application computer circuits may share all or portions of trace collection logic. In yet another example, capabilities of application computer logic and memory configurations may vary within different the application computer circuits. Application computer circuits and computing clusters may have shared or independent memory systems. Other combinations will be readily apparent to one of ordinary skill in the art having access to the instant specification.

What is claimed is:

1. A method of operating a computer system having a first application computer circuit having a first memory, a second application computer circuit having a second memory, and a bi-directional, high speed data interface coupling together the first and second application computer circuits, comprising:
   in a normal mode, executing user applications in the first computer circuit and executing user applications in the second computer circuit; and
   in a debug mode:
   (i) generating trace information in the first application computer circuit while executing a user application program in the second application computer circuit;
   (ii) sending the trace information from the first application computer circuit to the second application computer circuit over the high speed data interface; and
   (iii) storing the received trace information in a buffer of the second memory of the second application computer circuit while concurrently executing a user application program in the second application computer circuit.

2. The method of claim 1 in which the storing includes storing the received trace collection information in a trace buffer in the memory of the second application computer circuit.

3. A computing cluster, comprising:
   a first application computer circuit having a first application computer logic, a first application memory coupled to the first application computer logic, a first trace collection circuit coupled to the first application computer logic, a first trace export circuit coupled to the first trace collection circuit, a first data output circuit coupled to the first trace export circuit, and a first data input circuit coupled to the first application computer logic;
   a second application computer circuit having a second application computer logic, a second application memory coupled to the second application computer logic, a second trace collection circuit coupled to the second application computer logic, a second trace export circuit coupled to the second trace collection circuit, a second data output circuit coupled to the second trace export circuit, and a second data input circuit coupled to the second application computer logic; and
   a high speed data interface coupled between the first data output circuit and the second data input circuit, and between the second data output circuit and the first data input circuit.

4. The computing cluster of claim 3 in which:
   (i) the first and second application computer circuits operate in a normal mode of operation; and
   (ii) in a debug mode, the first application computer circuit generates trace information while the second application computer circuit receives and stores the trace information in a trace buffer in the second application memory.

5. The cluster of claim 3 including an integrated circuit carrying the first and second application computer circuits and the high speed data interface.

6. The cluster of claim 3 in which one of the application computer logics is a reduced instruction set computer (RISC) core.

7. The cluster of claim 3 in which one of the application computer logics is a complex instruction set computer (CISC) core.

8. The cluster of claim 3 in which one of the application computer logics is a digital signal processor (DSP) core.

9. The cluster of claim 3 including a third application computer circuit coupled to the high speed data interface.

\* \* \* \* \*